US005466979A

United States Patent [19]

Bryant et al.

[11] Patent Number: 5,466,979

[45] Date of Patent: Nov. 14, 1995

[54] METHODS AND APPARATUS TO REDUCE WEAR ON SLIDING SURFACES

[75] Inventors: Michael D. Bryant, Austin, Tex.; Jau-Wen Lin, Changhua City, Taiwan

[73] Assignee: Board of Regents, The University of, Austin, Tex.

[21] Appl. No.: 26,676

[22] Filed: Mar. 3, 1993

[51] Int. Cl.$^{6}$ .......................... H02K 13/00; H01R 39/18; H01R 39/24

[52] U.S. Cl. .......................................... 310/248; 310/251

[58] Field of Search .................................. 310/248, 251; 192/109 F

[56] References Cited

U.S. PATENT DOCUMENTS

| | | | |
|---|---|---|---|
| 1,352,408 | 9/1920 | Hood | 310/248 |
| 2,153,049 | 4/1939 | Myers | 310/248 |
| 3,590,300 | 6/1971 | Moberly | 310/248 |
| 3,786,292 | 1/1974 | Wiggs | 310/251 |
| 3,959,679 | 5/1976 | Buckley | 310/232 |
| 4,139,251 | 2/1979 | Miller et al. | 310/232 |
| 4,400,641 | 8/1983 | Vishnevsky et al. | 310/323 |
| 4,529,899 | 7/1985 | Mabuchi et al. | 310/248 |
| 4,785,214 | 11/1988 | Mummert | 310/241 |
| 4,813,532 | 3/1989 | Harper | 198/760 |
| 4,971,455 | 11/1990 | Kawakami et al. | 384/1 |
| 4,992,691 | 2/1991 | Mlynarz | 310/232 |

OTHER PUBLICATIONS

D. Godfrey, 1967, "Vibration Reduces Metal to Metal Contact and Causes An Apparent Reduction in Friction," ASLE Transactions, vol. 10, pp. 183–192.

J. J. Santini and F. E. Kennedy, 1975, "An Experimental Investigation of Surface Temperatures and Wear in Disk Brakes," Lubrication Engineering, vol. 31, pp. 402–417.

Morganite Electrical Carbon, Limited, 1978, "Carbon Brushes and Electrical Machines," cover, title page, copyright page, pp. 165, 166.

A. O. Lebeck, 1980 "A Test Apparatus for Measuring the Effects of Waviness in Mechanical Face Seals," ASLE Transactions, vol. 24, No. 3, pp. 371–378.

K. Kato, A. Iwabuchi, and T. Kayaba, 1982, "The Effects of Friction–Induced Vibration on Friction and Wear," Wear, vol. 80, pp. 307–320.

Aronov, V., A. F. D'Souza, S. Kalpakjian and I. Shareef, 1983, "Experimental Investigation of the Effect of System Rigidity on Wear and Friction–Induced Vibrations," J. of Lubr. Tech., vol. 105, pp. 206–211.

Erle I. Shobert, 1983, "Friction and Chatter," Proc. 1983 International Current Collector Conference, Annapolis, MD, cover, pp. iii, iv, 248–253.

H. Weber, J. Herberger, R. Pilz, and TH Karl–Marx–Stadt, 1984, "Turning of Machinable Glass Ceramics with an Ultrasonically Vibrated Tool," Annals of the CIRP, vol. 33, No. 1, pp. 84–877.

H. Goto and M. Ashida, 1984, "Effects of Ultrasonic Vibration on the Wear Characteristics of a Carbon Steel: Analysis of the Wear Mechanism," Wear, vol. 94, pp. 13–27.

(List continued on next page.)

*Primary Examiner*—Clayton E. LaBelle
*Attorney, Agent, or Firm*—Arnold, White & Durkee

[57] ABSTRACT

Methods and apparatus to reduce wear on surfaces in sliding contact by inducing vibratory movement in one or more of the surfaces. The movement is substantially perpendicular to a plane of contact between the surfaces and substantially nonuniform across the area of contact. The nonuniform vibratory motion of one surface with respect to another results in small rotational vibration of one surface with respect to another even as contact is maintained between the surfaces. Rotational motions tend to decrease surface wear due to thermal mounding by moving the zone of actual contact with time; rotational motions also open temporary gaps between the surfaces which allow the escape of wear particles, thus decreasing subsequent abrasive wear. The invention may be applied to sliding electrical contacts, either linear or rotating, and to sliding frictional contacts, as in brakes and clutches. Application of the invention reduces wear on electrical contacts while maintaining electrical continuity, and reduces wear on brake system components without substantially reducing effective braking force.

24 Claims, 6 Drawing Sheets

OTHER PUBLICATIONS

N. Saka, M. J. Liou, and N. P. Suh, 1984, "The Role of Tribology in Electrical Contact Phenomena," Wear, vol. 100, pp. 77–105.

Aronov, V., A. F. D'Souza, S. Kalpakjian and I. Shareef, 1984, "Interactions Among Friction, Wear and System Stiffness—Part 1: Effect of Normal Load and System Stiffness," J. of Tribology, vol. 106, pp. 54–58.

Aronov, V., A. F. D'Souza, S. Kalpakjian and I, Shareef, 1984, "Interactions Among Friction, Wear and System Stiffness—Part 2: Vibration Induced by Dry Friction," J. of Tribology, vol. 106, pp. 59–64.

Aronov, V., A. F. D'Souza, S. Kalpakjian and I. Shareef, 1984, "Interactions Among Friction, Wear and System Stiffness—Part 3: Wear Model," J. of Tribology, vol. 106, pp. 65–69.

H. Tian, N. Saka, and N. P. Suh, 1989, "BoundaryLubrication Sudies on Undulated Titanium Surfaces," STLE TribologyTransactions, vol. 32, No. 3, pp. 289–296.

T. Moriwaki and E. Shamoto, 1991, "Ultrapreciation Diamond Turning of Stainless Steel by Applying Ultrasonic Vibration," Annals of the CIRP, vol. 40, No. 1, pp. 559–562.

National Science Foundation Surface Engineering and Tribology Program: Project Summaries–Jan. 1992, Entire Report.

S. T. Oktay and N. P. Suh, 1992, "Wear Debris Formation and Agglomeration," J. of Tribology, vol. 114, pp. 379–393.

Lin, Jau–Wen, 1992, "Visualization of the Contact Interface and Observation of Interface Phenomena in Sliding Wear of Carbon Brushses," Ph.D. dissertation, The University of Texas at Austin, Advisor, M. D. Bryant, May 1992.

M. D. Bryant , 1992, National Science Foundation Proposal, Investigating Effects of Vibrations and Surface Waviness on Dry–Sliding Wear and Friction.

METHODS AND APPARATUS TO REDUCE WEAR ON SLIDING SURFACES

Work on the invention was supported in part by National Science Foundation grant MSM-8818337. The government has certain rights in the invention.

BACKGROUND

Field of the Invention

The invention relates to the reduction of wear on surfaces maintaining sliding contact.

Friction and Wear of Sliding Surfaces

All real surfaces are rough, possessing topographies on a macro- or microscopic scale that consist of surface height variations (hills and valleys) with respect to an idealized reference plane which lies within or substantially parallel to the surface. The reference plane shape corresponds to that of the surface without roughness.

Contact between real surfaces generally occurs at the interface between hills on one surface with hills and/or valleys of the other surface. The interface comprises an apparent zone (or area) of contact within or substantially conforming to the sectors of reference plane common to both bodies during contact. Within the zone there are smaller areas or islands of actual contact. Relative tangential motion (substantially parallel to the reference plane over the zone of contact) between surfaces in contact generally causes movement of the point(s) of contact across one or both surfaces.

Friction and wear depend on interfacial conditions, including interfacial materials, lubricants, temperature, forces, films, topology, the presence of other bodies or particles, and the degree of separation of the surfaces. Wear is commonly defined as a progressive loss of substance from a contact surface resulting from relative motion at the surface; it may conveniently be classified into several types, three of which are adhesive wear, corrosive wear and abrasive wear.

Adhesive wear occurs when microscopic hills (asperities) present on both contacting surfaces weld or bond together. If the bonds are strong, subsequent rubbing motions may shear a hill off one of the surfaces, generating a tiny wear particle. Adhesive wear often predominates at lower sliding speeds and forces, when other wear mechanisms are absent.

Corrosive wear is often associated with mild-to-moderate wear rates and may supplement or replace adhesive wear in metals. Corrosive agents usually present in the atmosphere attack metal atoms exposed by rubbing, and a thin corrosive layer forms on the surface. Subsequent rubbing shears the film off the surface to form a wear particle.

Abrasive wear, characterized by larger wear particles and higher wear rates than those associated with adhesive or corrosive wear, commonly occurs in severe operational conditions. Hard particles become entrapped within the sliding interface and cut or groove material out from one of the surfaces. Abrasive particles may originate from earlier wear events and/or the environment.

In addition to the three wear mechanisms described, thermal mounding due to localized heating of one or both contact surfaces may result in even higher wear rates than those seen with abrasive wear. The heat may be generated by friction and/or electric currents, and it results in local expansion of surface material to form one or more mounds which rise above the local surface. Faster growing mounds tend to concentrate loads on themselves, further increasing their temperature and thus their height above the local surface. The resultant rising temperatures and mechanical stresses tend to promote loss of large particles from one or both surfaces. Particles entrapped within the interface then increase friction and wear rate, as well as destabilizing electrical contact resistance. Most harmful are larger particles which abrade, plow and separate sliding surfaces.

Methods of Reducing Contact Wear

The high wear rates associated with thermal mounding have been alleviated by several techniques. For example, making one of the contact surfaces more compliant to deforming forces applied substantially perpendicular to the plane of contact tends to quench thermal mounds because the compliant surface remains more substantially in contact and load concentration at thermal mounds is thereby reduced. Compliant surfaces, however, require special materials and/or manufacturing techniques which tend to raise their cost.

Abrasive wear may also be reduced by providing slots, grooves, valleys, pits or depressions in the contact surfaces in which wear particles may be trapped and from which they can be eliminated. Undulations already present in or added to the height of sliding surfaces have lead to significant reductions in friction and wear, as well as stabilization of electrical contact resistance. Surface undulations may induce contact vibrations at relatively high surface speeds, but vibration is generally absent at relatively low surface speeds. Vibration which is substantially transverse to the direction of movement may have the effect of shifting areas of localized surface heating and thus reducing the tendency to thermal mounding and wear, but contact vibration has been reported to increase as well as decrease friction and wear rates. There is no accepted method of predicting what modes of vibration will optimally reduce wear rates, especially in applications where contact must be maintained continuously to generate adequate frictional force (e.g., in brakes or clutches) or to provide a continuous electrical path (e.g., in electrical commutators, slip rings, and substantially linear sliding contacts).

SUMMARY OF THE INVENTION

The invention relates to methods and apparatus to reduce wear of one or both of first and second surfaces in sliding contact substantially within a zone of contact. The zone lies within or substantially conforms to a reference plane of contact, which may be curved or flat. Wear reduction is achieved by inducing vibratory motion in one or both surfaces with a vibration force actuator, the vibratory motion comprising motion substantially perpendicular to the reference plane of contact and also substantially nonuniform across the zone of contact. Substantially nonuniform motion across the zone of contact implies a greater motion of one surface with respect to the other in some portion of the zone, relative to the analogous motion in another portion of the zone. Such nonuniform movement is associated with rotation of one surface with respect to the other surface about an axis nonperpendicular to the reference plane of contact, i.e., the movement results in rotational vibration. Three preferred embodiments of the invention are distinguished by the form of the vibration force actuator used to induce the nonuniform motion.

A First Invention Embodiment

A first embodiment has a vibration force actuator comprising a series of spaced, surface ridges (surface height variations comprising hills separated by valleys) in one or both surfaces, which are oriented with the ridge lines (longitudinal axes) substantially nonparallel and nonperpendicular to the direction of relative motion between the surfaces. The ridges may induce vibrations in the surfaces during such relative motion of the surfaces. The frequencies of induced vibrations are functions of the spacing of the ridges in the direction of relative motion and the velocity of the relative motion (surface velocity).

Induced vibrations generally comprise vibrations directed substantially perpendicular to the reference plane of contact (perpendicular vibrations). The reference plane substantially defines the interface between a first and second surface in sliding contact. However, in the present invention, the induced perpendicular vibration amplitudes are substantially nonuniform across the zone of contact (comprising areas of actual contact) of first and second surfaces. Thus, the vibratory amplitude differences across the zone of contact are associated with small rotational vibrations of one surface with respect to the other about an axis nonperpendicular to the reference plane of contact.

Vibrations (including rotational vibration) may in general be induced at any desired frequency, but are most effectively induced (highest amplitude per amount of vibration energy introduced) when the vibrations are substantially at or near a resonant frequency of the first and/or second surface and/or of the first surface coupled to the second surface. Note that each surface alone, as well as the surfaces coupled, may have a plurality of resonant frequencies. Vibrations may be simultaneously induced at a plurality of these frequencies to achieve rotational vibration of one surface with respect to another in the present invention.

Induced rotations of a first surface with respect to a second surface serve a dual purpose. First, they provide small gaps between the surfaces which allow the escape of abrasive wear particles. The gaps are preferably between about 1 and about 1000 μm, or more preferably between about 15 and about 300 μm, and still more preferably between about 15 and about 100 μm at their widest point.

A second purpose of rotations of contacting surfaces in the present invention arises due to the resulting movement of area(s) of actual contact between the surfaces with time. This action tends to disrupt the development of hot spots and eliminate thermal mounding which would otherwise occur when there is prolonged contact in one area. Experiments have shown that thermal mounds form, evolve and detach from a surface (in particular, the surface of an electrical brush) during time intervals (Tm) of about 4 to about 35 ms.

Because relative rotations of first and second surfaces cause movement of contact areas without total separation of first and second surfaces, electrical continuity or frictional force, which depend on actual contact, can be maintained during rotational vibration. Thus, relative rotational vibration of first and second contact surfaces, associated with nonuniform vibratory motion occurring across a contact area of first and second surfaces, is a feature of the present invention.

Nonuniform vibration may be induced across an area of contact between first and second surfaces, in a direction substantially perpendicular to the reference plane of contact between surfaces, by several means. One means would be to induce a mechanical response to applied vibration force which would vary across the area of contact (as by changing the damping of surface movement substantially perpendicular to the reference plane of contact across the area of contact). Alternatively and preferably, one may apply vibratory forces nonuniformly (i.e., where surface ridges corresponding to a particular vibration frequency are oriented to apply out-of-phase forces between contacting surfaces across a contact area, the phase shift across the area of contact being an angle $\Theta$ where $0° < \Theta < 360°$). In preferred embodiments of the present invention having spaced surface ridges, this is accomplished by having the ridge lines (longitudinal axes) of the surfaces ridges oriented substantially at an angle $\alpha$ to the direction of relative surface movement (ridge lines are not necessarily either straight or parallel), where $0° < \alpha < 90°$. In preferred embodiments, the desired value of $\alpha$ is that which results in a phase shift across the zone of contact of about 90° to about 270°, more preferably about 180°.

A Second Invention Embodiment

A second embodiment of the invention comprises one or more (separate) vibration force actuators having driving elements coupled to, and capable of imparting vibratory motion to, first and/or second surfaces. The surfaces are substantially smooth and are in sliding contact. As in the first embodiment, vibratory movement is induced substantially nonuniformly across the zone of first and second surface contact. Such vibratory movement is associated with small rotations of one surface with respect to the other about an axis nonperpendicular to the reference plane of contact. Inventions of the second embodiment include actuators comprising hydraulic, pneumatic, mechanical, electromagnetic, and piezoelectric or magnetostrictive driving elements, e.g., a hydraulic cylinder coupled to a time-varying source of hydraulic pressure (as in a hydraulic brake system or hydraulically operated clutch), or an electrical solenoid coupled to a time-varying source of electric current (as a vibrating solenoid coupled to a sliding contact carrying power to an electric train).

Vibration forces applied by a separate vibration force actuator or induced by surface height variations on first and/or second slidably contacting surfaces are preferably substantially equal to one or more resonant frequencies of the first and/or second surface (including surface support structures, where applicable).

Note that in preferred embodiments of the present invention, the first and second surfaces remain coupled during vibration. Thus, resonant frequencies of the coupled surfaces comprise a larger set than the resonant frequencies of either the first or second surfaces alone. Although vibration at resonant frequencies of the coupled surfaces could be used in preferred embodiments, determination of a set of resonant frequencies for either the first or second surface alone is in many cases computationally simpler. Experimental evidence supports the use of calculated or otherwise determined resonant frequencies for one surface as useful approximations for the relevant coupled resonant frequencies.

Inventions of the first and second embodiments relate to rotational vibration of a first surface with respect to a second surface about an axis substantially nonperpendicular to the reference plane of contact between the surfaces (or substantially nonperpendicular to the contacting surfaces themselves). The rotations are preferably sufficiently large to allow effective reduction of thermal mounding and removal of wear particles during the vibrational motion, and they occur during substantially constant contact between the first and second surfaces. The substantially constant contact results in maintenance of effective electrical continuity or effective friction force during vibration, while wear is significantly reduced.

A Third Invention Embodiment

A third embodiment of the invention includes an actuator comprising a plurality of component vibration force actuators (including separate actuators) analogous to those found in the first and second embodiments. Each component actuator may be coupled to first and/or second surfaces in sliding contact. As in the first and second embodiments, vibratory motions induced by each component actuator may be characterized by a plurality of frequencies, and are induced substantially nonuniformly across the zone of first and second surface contact.

Small rotational vibrations of one surface with respect to the other about an axis nonperpendicular to the reference plane of contact are thereby induced. As in the first and second embodiments, the frequencies of induced vibratory motions substantially approximate resonant frequencies of the first and/or second surfaces (including structures coupled thereto), and may also comprise or consist of resonant frequencies of first and second surfaces (including structures coupled thereto) which are also coupled to each other. Throughout this specification, reference to an actuator are understood to include any actuator described in relation to any of the first, second or third invention embodiments above.

DETAILED DESCRIPTION

Preferred Embodiments

A first embodiment of the invention relates to apparatus for reducing wear on first and second surfaces in substantial sliding contact at a zone of contact, the zone comprising a reference plane of contact, and relative movement between the surfaces having a direction of movement. The apparatus comprises a vibration force actuator coupled to the first and/or second surfaces to impart a vibratory movement to the first and/or second surfaces, said vibratory movement being substantially perpendicular to the reference plane of contact and substantially nonuniform across the zone of contact.

Figure 1:
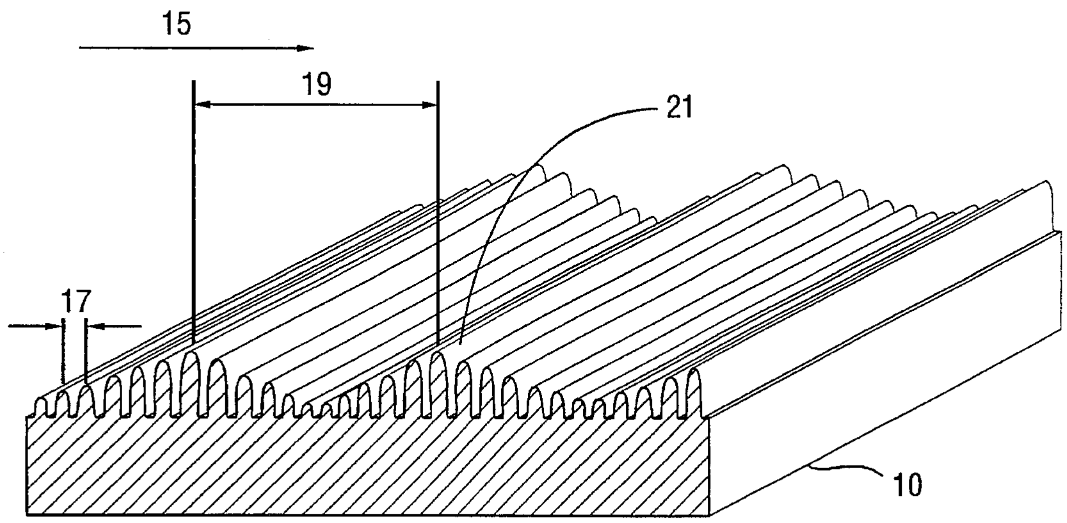
FIG. 1 illustrates a pattern of surface height variations which may induce vibrational motion in surfaces in sliding contact.

The actuator may comprise a hydraulic or electromagnetic driving element (e.g., a hydraulic cylinder or solenoid) coupled to the first and/or second surface, or it may comprise spaced surface height variations (ridges, as in FIGS. 1 and 2) within the first and/or second surfaces, with longitudinal axes substantially neither perpendicular to nor parallel to the direction of movement on the first and/or second surfaces (i.e., the ridge longitudinal axes are oblique to the direction of movement). Vibrations comprising more than one frequency may be induced by several means, one means being by movement as indicated by arrow 15 across a surface similar to 10 in FIG. 1. Movement across ridges 21 of periodically varying heights, wherein spacing between adjacent similar height ridges 19 is different from the spacing between adjacent ridges 17, induces vibrations having at least two different frequencies in the sliding surfaces.

A second embodiment of the present invention is a method of reducing wear on first and/or second surfaces having first and second resonant frequencies respectively, wherein the first surface moves at a movement velocity with respect to and in substantial sliding contact with the second surface at a zone of contact, the zone comprising a reference plane of contact. The method comprises establishing spaced surface height variations in said first and/or second surfaces for causing vibratory motion of the second surface substantially perpendicular to the reference plane and substantially nonuniform across the zone of contact, thereby reducing surface wear.

The surface height variations may preferably be substantially sinusoidal in shape and have amplitude a function of movement velocity. Another preferred surface topography includes superposition of a plurality of sinusoids of different wavelengths. Amplitude is chosen for a given movement velocity so that rotational vibration is induced in the first surface with respect to the second, the resultant rotational motion causing gaps to open within portions of the contact zone between the first and second surfaces while contact between the surfaces is maintained. The maximum gap width in preferred embodiments is based on the gap necessary for effective removal of wear particles from the zone of contact and the consequent effective reduction in wear rate.

Although a desired gap size may be achieved by choice of amplitude alone, it is more readily achieved in preferred embodiments by choice of one or more of the induced (forced) vibration frequencies to be equal respectively to resonant frequencies of either or both first and second surfaces. In sliding electrical contact applications of the present invention, resonant frequencies of the electrical brush, with or without its support and contact force spring are generally preferred as vibration frequencies because they are generally lower than the resonant frequencies of the other surface (e.g., a commutator, slip ring or substantially linear electrical conductor). Note that in general, both the first and second contacting surfaces taken individually and the first and second contacting surfaces considered coupled at their point(s) of contact have a plurality of resonant frequencies, with the lowest frequencies being most preferred for induction in the first and/or second surfaces. However, a lower bound to the preferred frequencies is related to the value of Tm for each embodiment, Tm being the time intervals in which thermal mounds form, evolve and detach during each embodiment.

Tm depends on several factors, including frictional heat generation, materials, loads, and the geometry of the contacting surfaces; of particular importance are thermal properties, e.g., thermal conductivities and specific heats of the contacting surfaces. If existing areas of actual contact between two surfaces are shifted to different locations within the zone of contact in a time less than Tm for the particular surfaces, wear due to thermal mounding can be reduced or eliminated. In the present invention, such shifts from one actual contact area to another (within a zone of contact) arise because of rotational vibrations induced in one or both surfaces with respect to the other. To minimize thermal mounding, rotational vibrations must occur at or above a frequency which is a function of Tm.

Tm is related to the minimum frequency of required rotational vibration by the relationship f=1/Tm. For Tm of 4 to 35 ms, the minimum vibration frequency range would be ≈29 to 250 Hz. Although any rotational vibration frequency higher than the minimum thus established could be used (including ultrasonic vibrations), preferred embodiments of the present invention have at least one resonant frequency of at least one of the contacting surfaces which substantially exceeds 1/Tm for those surfaces.

The present invention also comprises a method for reducing wear in electric machinery brushes, the brushes having one or more resonant frequencies and contacting an electrically conductive surface at a zone of contact with a surface speed of brushes with respect to conductive surface. The method comprises estimating one or more resonant frequencies of the brushes; and establishing spaced surface height variations in the conductive surface, said surface height variations causing vibratory motion of the brushes substantially perpendicular to said conductive surface and substantially nonuniform across the zone of contact at one or more of the resonant frequencies, thereby reducing surface wear.

As above, height variations are preferably sinusoidal in shape and have amplitude which is a function of surface speed of the conductive surface with respect to the brushes. Note that the vibratory motion comprises rotational vibration of brushes with respect to the conductive surface about an axis nonperpendicular to the conductive surface.

Another preferred embodiment of the invention is a method for reducing wear in a brake system comprising one or a plurality of brake shoe assemblies having one or a plurality of resonant frequencies and slidably contacting one or a plurality of braked element surfaces along a movement axis, the method comprising establishing spaced surface height variations in the braked element surface, the longitudinal axes of said height variations being substantially oblique to the movement axis and spaced to induce substantially nonuniform vibratory motion across the shoe assembly in a direction substantially perpendicular to the braked element surface at a frequency substantially equal to one or a plurality of the resonant frequencies during sliding contact of the brake shoe assembly and the braked element, thereby reducing brake shoe wear.

Another preferred embodiment of the invention is a method for reducing wear in a clutch system comprising one or a plurality of clutch plates having one or a plurality of resonant frequencies and slidably contacting one or a plurality of driving element surfaces along a movement axis. The method comprises establishing spaced surface height variations in the driving element surface, the longitudinal axes of said height variations being substantially oblique to the movement axis and spaced to induce substantially nonuniform vibratory motion across the clutch plate assembly in a direction substantially perpendicular to the driving element surface at a frequency substantially equal to one or a plurality of the resonant frequencies during sliding contact of the clutch plate assembly and the driving element, thereby reducing clutch plate wear.

Still another preferred embodiment of the invention is an electric machine comprising one or a plurality of brushes having a plurality of resonant frequencies, the brushes being in sliding electrical contact with an electrically conductive surface, said conductive surface comprising surface height variations spaced to induce substantially nonuniform vibratory motion across each of the brushes in a direction substantially perpendicular to the conductive surface at frequencies substantially equal to a plurality of the resonant frequencies.

The present invention is also embodied in a brake system comprising at least one brake shoe assembly which may slidably contact at least one braked element at a zone of contact, the zone comprising a reference plane of contact, the shoe assembly and the braked element being coupled to a vibration force actuator, the assembly having a plurality of resonant frequencies, and the vibration force actuator being capable of inducing vibratory motion in the shoe assembly substantially perpendicular to the reference plane of contact, substantially nonuniformly across the zone of contact, and at a plurality of frequencies substantially equal to said resonant frequencies.

The present invention is also embodied in a clutch system comprising at least one clutch plate assembly which may slidably contact at least one driving element at a zone of contact, the zone comprising a reference plane of contact, the clutch plate assembly and the driving element being coupled to a vibration force actuator, the clutch plate assembly (comprising a clutch pressure plate, springs, and a clutch plate) having a plurality of clutch plate assembly resonant frequencies, and the vibration force actuator being capable of inducing vibratory motion in the clutch plate assembly substantially perpendicular to the reference plane of contact, substantially nonuniformly across the zone of contact, and at a plurality of frequencies substantially equal to said clutch plate assembly resonant frequencies.

Application of the Invention to an Electrical Machine

One embodiment of the present invention may be applied to a rotating electrical machine (i.e., a motor or generator), wherein the first surface (e.g., the surface of an electrical commutator or slip ring, hereinafter rotor) is wavy (i.e., having ridges or surface height variations), and the second surface (e.g., an electrical brush in contact with the rotor) is substantially smooth.

Figure 2:
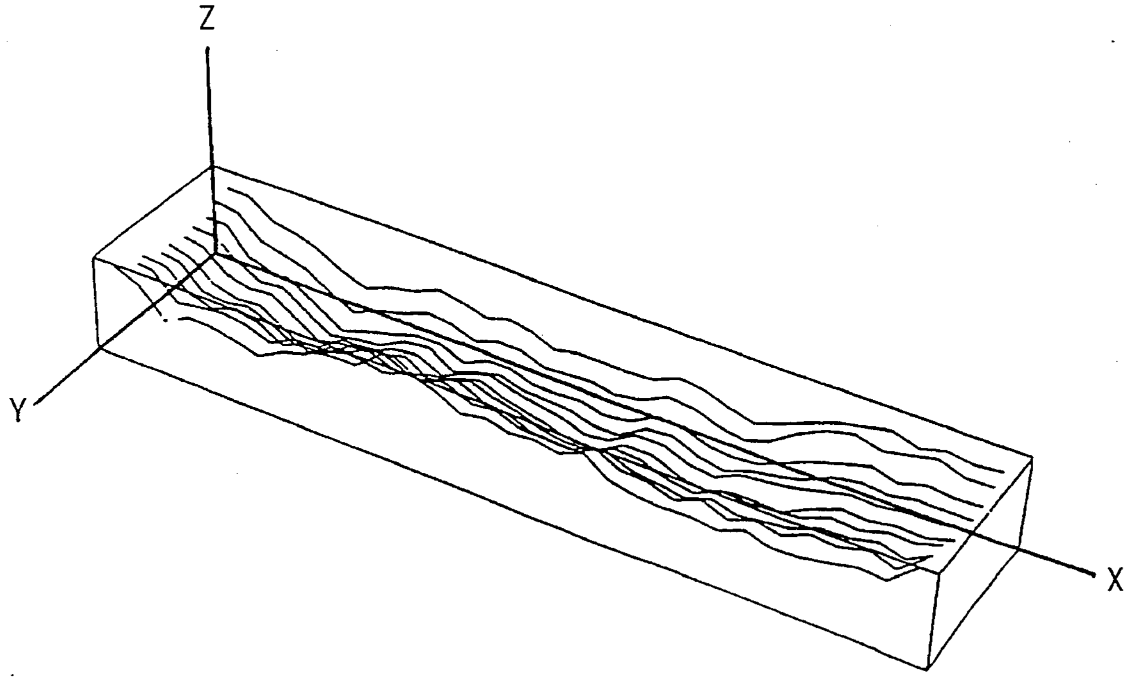
FIG. 2 illustrates a portion of an experimental surface to induce vibrational motion in another surface in sliding contact.

FIG. 2 illustrates the surface topography of the rotor as if the substantially circular rotor had been cut once substantially parallel to its axis of rotation and then flattened out along the X axis. In operation, a brush (illustrated in side elevation in FIG. 3) extends substantially across the width of the rotor (i.e., along the Y axis) and for a relatively short distance along the rotor in the direction of travel (i.e., along the X axis). Rotor surface height variations along the Z axis comprise a series of ridges having longitudinal axes generally nonparallel to the Y axis. Rotor surface topography may be measured, as in one embodiment, with a capacitance probe applied at 64 measurement points equally spaced along a circular track on the rotor circumference (i.e., along the X axis in FIG. 2). The rotor width in the embodiment considered was divided into 10 rings, each 2.54 mm wide, providing the 10 height traces spaced along the Y axis in FIG. 2.

Figure 3:
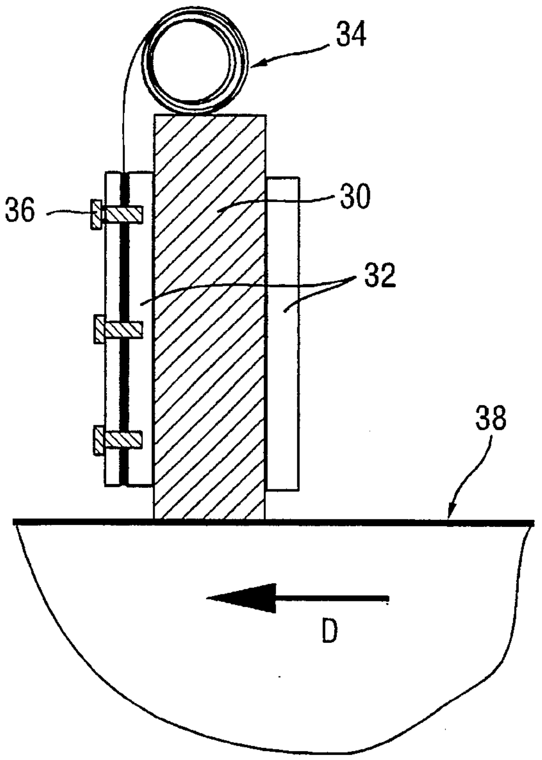
FIG. 3 illustrates a side elevation of a brush in a brush holder, the brush being forced into contact with a surface by a conforce spring.
Figure 4:
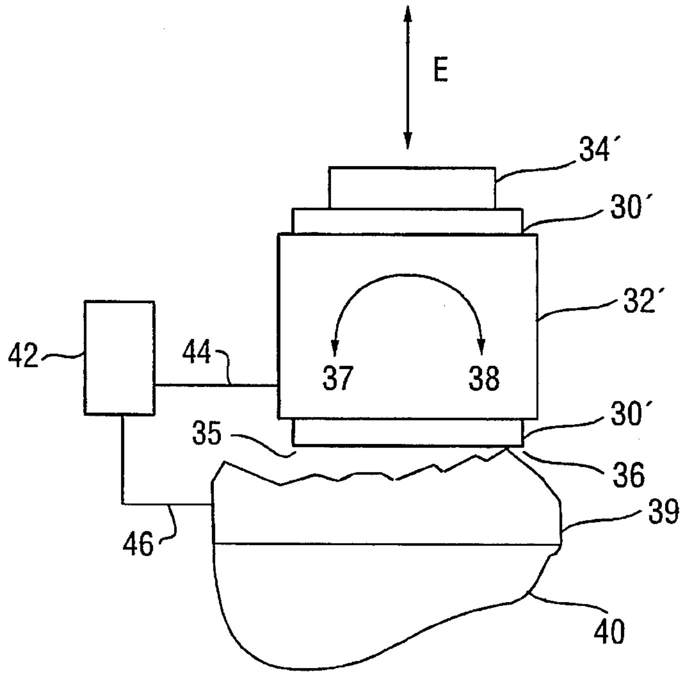
FIG. 4 illustrates a front elevation of a brush in a brush holder, the brush being forced into contact with a surface by a conforce spring.

The effect of rotor surface height variations as illustrated in FIG. 2 on brush motion can be seen in FIGS. 3 and 4. FIG. 3 illustrates a side elevation of a brush 30 in a brush holder 32, the brush being forced into contact with surface 38 by conforce spring 34. The spring 34 is coupled to brush holder 32 by a plurality of bolts 36. The direction of relative motion of brush 30 with respect to surface 38 is indicated by arrow D.

FIG. 4 illustrates a front elevation of brush 30' (prime labels are used for the front elevation) in brush holder 32', the brush being forced into contact with surface 39 by conforce spring 34 . Note that surface 39 is substantially uneven under brush 30', leading to a single point of contact near brush edge 36 and a gap under brush edge 35. As the conforce spring 34' applies force substantially uniformly across brush 30', the force is opposed by a reaction force of surface 39 applied near brush edge 36. These opposing forces comprise a couple tending to rotate brush 30' counterclockwise (indicated by arrow 37 in FIG. 4), the couple acting with the spring and reaction forces, which tend to oscillate brush 30' in directions indicated by arrow E. Hence the brush 30' tends to be subject to both translational and rotational forces as brush 30' moves with respect to surface 39 (into or out of the paper plane in FIG. 4), and as the contact point(s) of surface 39 with brush 30' move from the region of brush edge 36 to brush edge 35 (thus changing the direction of the couple to one tending to cause clockwise rotation (indicated by arrow 38 in FIG. 4) of brush 30'). An alternative or supplemental method of inducing rotational vibration in brush 30' is an actuator 42 coupled by coupling 44 to brush holder 32' and, in some embodiments, coupled by coupling 46 to surface 39. Actuator 42 is coupled to and imparts vibrational motion to brush holder 32' and comprises, e.g., hydraulic, pneumatic, mechanical, electromagnetic, and piezoelectric or magnetostrictive driving elements. The vibrational motion coupled to the brush 30' through brush holder 32' comprises rotational vibration of brush 30' with respect to the surface 39 about an axis nonperpendicular to surface 39, and is associated with vibrational motion substantially perpendicular to and substantially nonuniform across surface 39 at one or more frequencies substantially equal to one or more resonant frequencies of brush 30' or surface 39 (including structures to which brush 30' and/or surface 39 are coupled).

Surface height variation as illustrated in FIGS. 2 and 4 may be machined, molded, or otherwise established in the rotor surface. In one embodiment, surface height variation was achieved by controlled curing of liquid polycarbonate epoxy 40 in FIG. 4, the curing generating stresses and resultant strains in an overlying copper sheet of which surface 39 is comprised. The generally aperiodic appearance of the surface topology extending along the X axis in FIG. 2 generates corresponding motions of brush 30' substantially in the directions of arrows E in FIG. 4 as brush 30' slides over the surface. These motions may be resolved through Fourier analysis into a summation of sinusoidal motions which, taken together, yield the composite motion which is characterized by the brush sliding over the surface.

Figure 5:
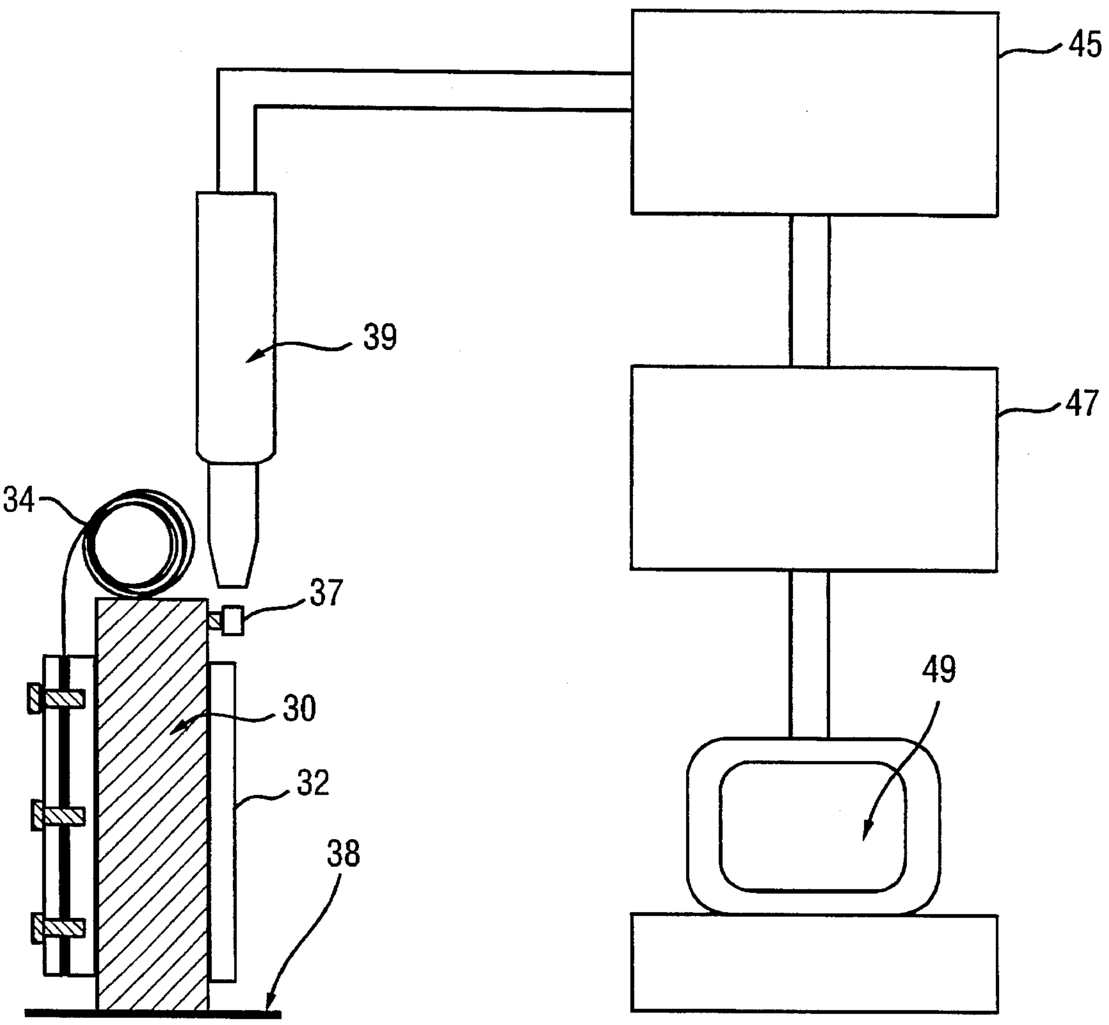
FIG. 5 illustrates a capacitance probe and Fourier analyzer for characterizing brush motions.

Such motions may be recorded by a capacitance probe 39 as shown in FIG. 5, sensing movement of a bolt 37 attached to brush 30. Brush 30 is restrained in brush holder 32 and forced into contact with surface 38 by conforce spring 34. Output of capacitance probe 39 is transmitted to amplifier 45, and the amplified output is then transmitted to Fourier analyzer 47 and computer 49. Fourier analyzer 47 determines the power density in microns (μm) for modes of vibration of brush 30 having from 1 to 23 cycles per revolution of surface 38 (the rotor). Power densities are plotted against mode number in FIG. 6 for a wavy rotor surface as used in the present invention. Since modes 1 and 2 (representing rotor tilt and bowing) depend principally on details of rotor mounting, only modes 3 and higher characterize the surface. Comparable power densities are plotted against vibration mode number in FIG. 7 for a substantially smooth rotor. Note that substantially more power is present in modes 10–16 for the wavy rotor than for the smooth rotor.

Figure 8:
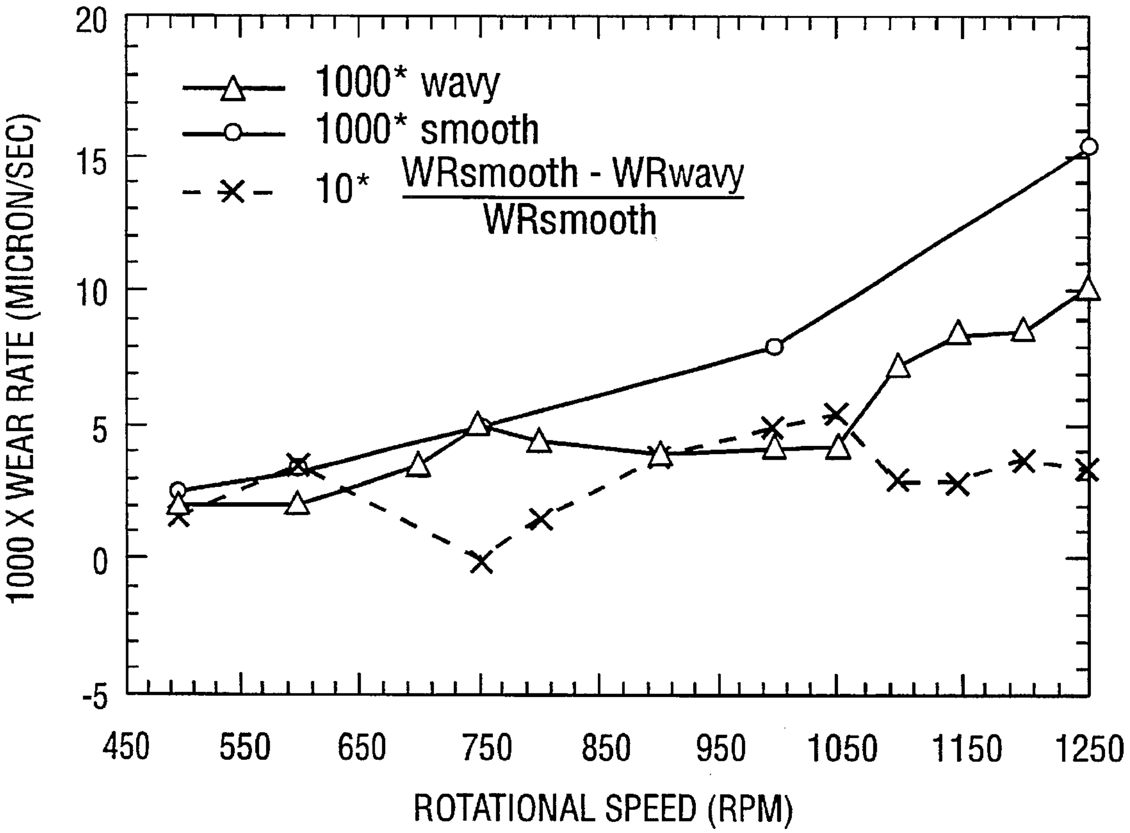
FIG. 8 illustrates plots of wear rates with respect to rotational speed for brushes sliding against both smooth and wavy surfaces.

Wear rates for brushes sliding against both smooth and wavy surfaces are plotted against rotational speed in FIG. 8. The smooth surface data are represented by solid circles, while that for a wavy surface is represented by solid triangles. The fractional difference between the two curves is indicated by the dashed line, and is seen to reach maxima (with wear reductions of almost 50%) near rotational speeds of 600 and 1000 rpm; these rotational speeds correspond to brush resonances, as shown below. Conversely, wear rates near rotational speeds of 500 and 750 rpm are nearly identical for smooth and wavy surfaces. FIG. 8 thus illustrates the importance of adjusting rotational speeds and/or brush resonances for maximum wear reduction in applications embodying the present invention.

Calculation of the Brush/Rotor Resonant Frequency

Often, system differential equations are formulated and solved and resonant frequencies are derived from eigenvalues. In the present case, nonlinearities in the conforce spring and the contact stiffness render this approach difficult. An alternative method based on energy conservation during a vibration cycle may be used. Simplifying assumptions commonly known by those skilled in the art, such as absence of energy gain or loss during operation, are applied. Hence, during longitudinal vibration of the brush-spring/rotor system, potential energy stored in conforce spring extension is converted into motional energy of the brush mass, which is then converted to potential energy of compression of the brush/rotor contact surface. Energy then reverts from the contact back to the spring via the brush mass. The system vibration energy is constant; energy losses (e.g., brush rubs against the holder) are replenished by the source driving the rotor. As a consequence, the maximum kinetic energy of the brush mass motions, which occurs at the instant between the end of the spring extension and the start of the contact compression, must equal the maximum potential energy which occurs either during the maximum extension of the spring or compression of the contact.

One vibration period T consists of the total time of spring extension Ts, plus the total time of contact compression Tc. The maximum potential energy stored in the (nonlinear) conforce load spring is the product of the constant spring force F and the maximum spring deflection x. The maximum kinetic energy is one half the brush mass M times the square of the maximum brush velocity. Equating maximum kinetic and potential energies relates the maximum velocity in terms of the maximum spring deflection.

Hertz's model of elastic impact of colliding bodies relates the total time of contact compression Tc to the inverse of the approach velocity between the bodies, using a proportionality constant A. The constant A depends on materials, curvature, surface waviness amplitude w, and surface wave number m. The total time of spring compression Ts was derived by applying Newton's law to the brush mass/spring system and integrating over time.

Constants of integration can be determined as follows: at the beginning of spring extension when the extension is zero, the brush velocity is equal to the maximum velocity, while half-way through the spring extension process when the brush velocity is zero, the spring extension equals the maximum spring deflection.

Excitations occur as the brush rides over the surface height variations (waves) of the rotor. The frequency of excitation for a certain waviness mode is the product of the rotational speed N (in rpm) and the wave number m of the waviness mode divided by a factor 60 which converts minutes to seconds. At resonance, the period T is the inverse of the excitation frequency, giving the resonant condition:

$$A(M/2Fx)^{1/10}+2(2Mx/F)^{1/2}=60/Nm$$

which relates maximum spring deflection x to system parameters and inputs. The equation is nonlinear in x due to the nonlinear action of the conforce spring and contact compression.

Figure 6:
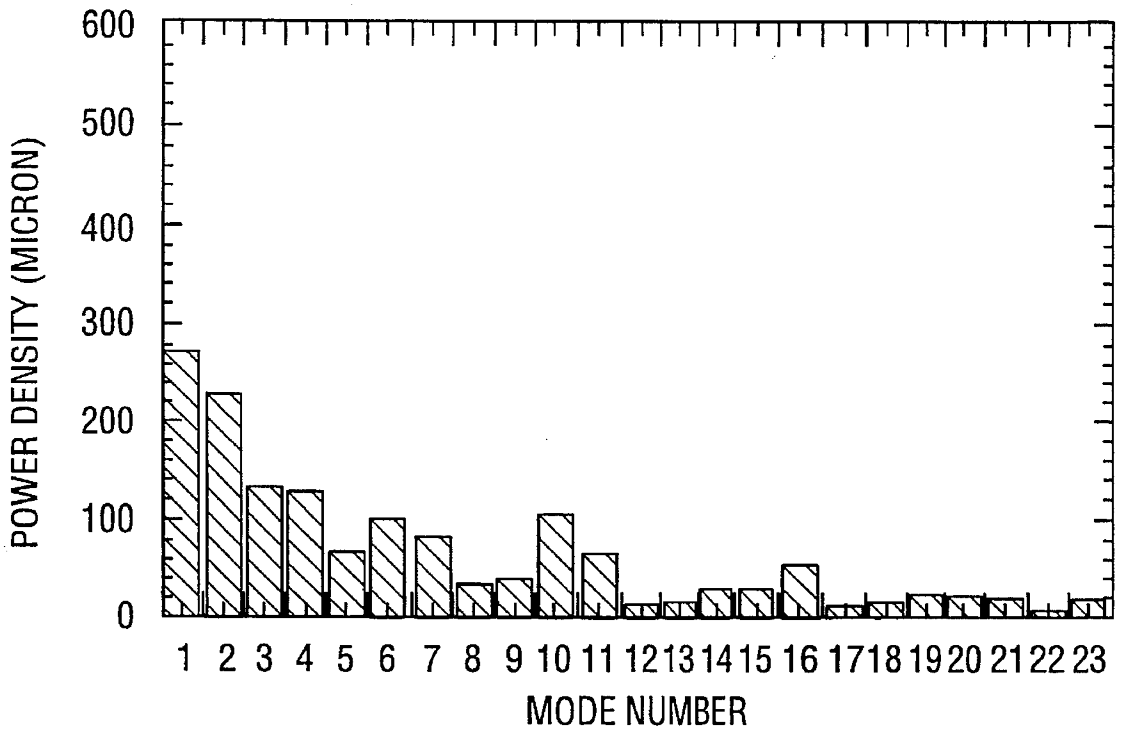
FIG. 6 illustrates power densities plotted against mode number for a wavy rotor surface as used in the present invention.
Figure 7:
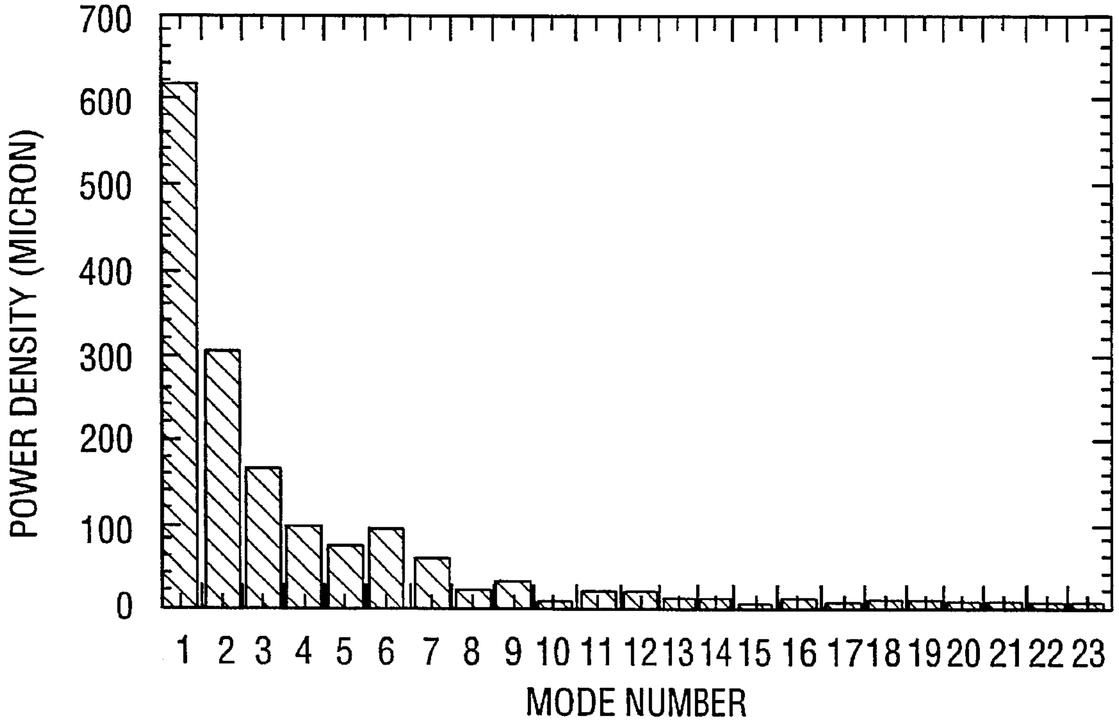
FIG. 7 illustrates power densities plotted against mode number for a substantially smooth rotor surface.
Figure 9:
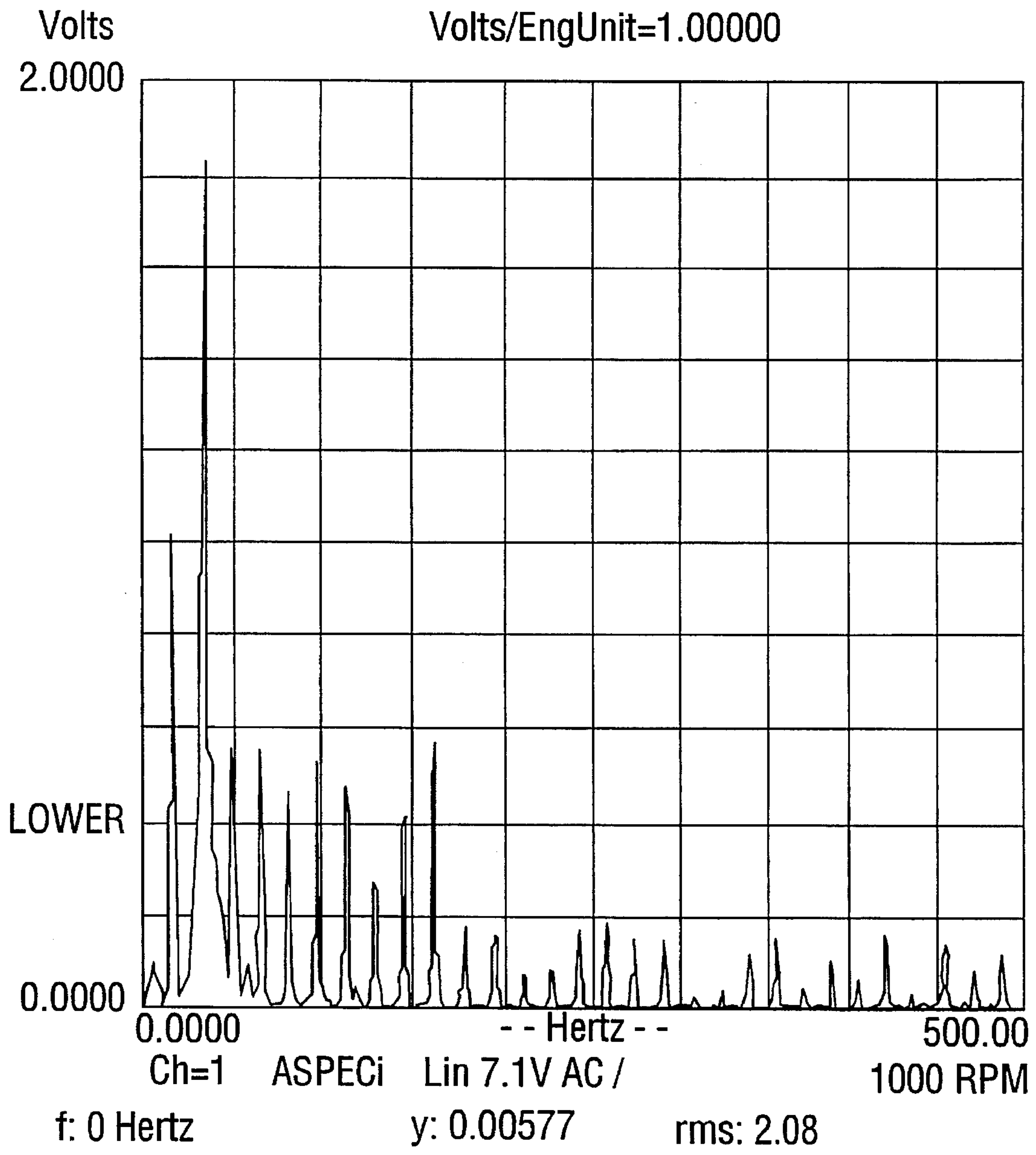
FIG. 9 is a spectral density diagram of brush displacement against a wavy rotor at a rotational speed of 1000 rpm.

At a rotational speed N of 1000 to 1050 rpm, a 10th mode excitation (m=10) provides w=104 μm of waviness amplitude (from FIG. 6). The equation gives x=530 μm of response amplitude with excitation period 0.005742 to 0.006 seconds, which corresponds to a frequency of 165 to 174 Hz. This matches well with the 160 to 175 Hz oscillation frequency of the 10th mode taken from FIG. 9, which is a spectral density diagram of brush deflection against a wavy rotor at a rotational speed of 1000 rpm. The relative sizes of modes 3 to 8 are about the same in FIGS. 6 and 9; however, near 1000 rpm, modes 9 and 10 resonate, and their amplitudes in FIG. 9 are bigger than those in FIG. 6. Thus, the substantial accuracy of the calculation is confirmed. Note also that even during oscillation at a resonant frequency, no significant change was detected in a voltage drop measured continuously across the brush-rotor interface or in the frictional force.

The preceding discussion describes experimental confirmation of design procedures usable in applying embodiments of the present invention to practical problems in the design of electrical machinery. As noted in this specification, alternative procedures are available to accomplish several design steps, and the application of equivalent procedures to those described is considered within the scope of the present invention.

Changes may be made in the construction, operation and arrangement of the various parts, elements, steps and procedures described herein without departing from the concept and scope of the invention as defined in the following claims.

What is claimed:

1. Apparatus for reducing wear on first and second surfaces in substantially sliding contact at a zone of contact, the zone comprising a reference plane of contact, and relative movement between the surfaces having a direction of movement, the apparatus comprising a vibration force actuator coupled to the first surface to impart a vibratory movement to the first surface, said vibratory movement being substantially perpendicular to the reference plane of contact and substantially nonuniform across the zone of contact, wherein the nonuniform movement across the zone of contact being a greater movement of one surface with respect to the other in some portion of the zone, relative to the analogous movement in another portion of the zone.

2. The apparatus of claim 1 wherein said vibration force actuator is additionally coupled to said second surface to impart a vibratory movement to said first surface, said vibratory movement being substantially perpendicular to said reference plane of contact and substantially nonuniform across said zone of contact.

3. The apparatus of claim 1 wherein the vibration force actuator comprises a hydraulic driving element.

4. The apparatus of claim 1 wherein the vibration force actuator comprises an electromagnetic driving element.

5. The apparatus of claim 1 wherein the vibration force actuator comprises spaced surface height variations on the first surface.

6. The apparatus of claim 5 wherein the height variations are substantially oblique to the direction of movement.

7. The apparatus of claim 2 wherein said vibration force actuator comprises spaced surface height variations on the first and second surfaces.

8. The apparatus of claim 7 wherein said spaced surface height variations are substantially oblique to the direction of movement.

9. A method for reducing wear on first and second surfaces having first and second resonant frequencies respectively, wherein the first surface moves at a movement velocity with respect to and in substantial sliding contact with the second surface at a zone of contact, the zone comprising a reference plane of contact, comprising forming spaced surface height variations in said first surface for causing vibratory motion of the second surface substantially perpendicular to the reference plane and substantially nonuniform across the zone of contact, wherein the nonuniform motion across the zone of contact being a greater motion of one surface with respect to the other in some portion of the zone, relative to the analogous motion in another portion of the zone, thereby reducing surface wear.

10. The method of claim 9 wherein spaced surface height variations are additionally formed in said second surface for causing vibratory motion of said first surface with respect to said second surface substantially perpendicular to said reference plane of contact and substantially nonuniform across said zone of contact, thereby reducing surface wear.

11. The method of claim 9 wherein said surface height variations are substantially sinusoidal.

12. The method of claim 11 wherein said sinusoidal variations have amplitude as a function of the movement velocity.

13. The method of claim 11 wherein said sinusoidal variations induce vibrational motion at a frequency substantially equal to the first resonant frequency.

14. The method of claim 11 wherein said sinusoidal variations induce vibrational motion at a frequency substantially equal to the second resonant frequency.

15. A method for reducing wear in electric machinery brushes, the brushes having at least one resonant frequency and contacting an electrically conductive surface at a zone of contact with a surface speed, comprising estimating a resonant frequency of the brushes; and forming spaced surface height variations in the conductive surface, said surface height variations causing vibratory motion of the brushes substantially perpendicular to said conductive surface and substantially nonuniform across the zone of contact at said resonant frequency, thereby reducing surface wear.

16. The method of claim 15 wherein the brushes have a plurality of resonant frequencies, and spaced surface height variations are formed on the conductive surface spaced to cause vibratory motion of the brushes substantially perpendicular to the conductive surface and substantially nonuniform across the zone of contact at a plurality of frequencies substantially equal to the resonant frequencies, thereby reducing brush wear.

17. The method of claim 15 wherein said height variations are substantially sinusoidal.

18. The method of claim 17 wherein said substantially sinusoidal height variations have amplitude which is a function of the surface speed.

19. The method of claim 15 wherein said vibratory motion comprises rotational vibration of brushes with respect to the conductive surface about an axis nonperpendicular to the conductive surface.

20. An electric machine comprising at least one brush having at least one resonant frequency, the at least one brush being in sliding contact with an electrically conductive surface at a zone of contact, the zone comprising a reference plane of contact, and relative movement between the at least one brush and surface being in a direction of movement, the machine comprising a vibration force actuator coupled to the at least one brush to impart vibratory movement to the at least one brush, said vibratory movement being substantially perpendicular to the reference plane of contact, substantially nonuniform across the zone of contact, wherein the nonuniform movement across the zone of contact being a greater movement of the at least one brush with respect to the electrically conductive surface in some portion of the zone, relative to the analogous movement in another portion of the zone, and at a frequency substantially equal to the resonant frequency.

21. The electric machine of claim 20 wherein the at least one rush has a plurality of resonant frequencies, and wherein said conductive surface comprises surface height variations spaced to induce substantially nonuniform vibratory motion across each of the at least one brush in a direction substantially perpendicular to the conductive surface at frequencies substantially equal to a plurality of the resonant frequencies.

22. The electric machine of claim 20 wherein said electrically conductive surface comprises a commutator.

23. The electric machine of claim 20 wherein said electrically conductive surface comprises a slip ring.

24. The electric machine of claim 20 wherein said electrically conductive surface comprises a substantially linear electrical conductor.

* * * * *